US012711193B2

(12) United States Patent
Jing et al.

(10) Patent No.: US 12,711,193 B2
(45) Date of Patent: Aug. 18, 2026

(54) WEBPAGE CREATION LEVERAGING GENERATIVE AI

(71) Applicant: MainFunc Inc., Cupertino, CA (US)

(72) Inventors: Kun Jing, Cupertino, CA (US); Kaihua Zhu, Cupertino, CA (US)

(73) Assignee: Genspark Inc., Palo Alto, CA (US)

( * ) Notice: Subject to any disclaimer, the term of this patent is extended or adjusted under 35 U.S.C. 154(b) by 0 days.

(21) Appl. No.: 18/649,876

(22) Filed: Apr. 29, 2024

(65) Prior Publication Data

US 2025/0335530 A1 Oct. 30, 2025

(51) Int. Cl.
*G06F 16/00* (2019.01)
*G06F 16/951* (2019.01)
*G06F 16/9532* (2019.01)
*G06F 16/957* (2019.01)

(52) U.S. Cl.
CPC ........ *G06F 16/9577* (2019.01); *G06F 16/951* (2019.01); *G06F 16/9532* (2019.01)

(58) Field of Classification Search
CPC ........ G16H 15/00; G16H 70/20; G16H 40/67; G16H 50/70; G16H 70/60; G16H 50/50; G16H 50/20; G16H 10/60; G16H 10/20; G06F 16/3329; G06F 16/3344; G06F 40/40; G06F 16/345; G06F 40/30; G06F 16/243; G06F 40/279; G06F 40/166; G06F 8/427; G06F 40/211; G06F 16/338; G06F 40/35; G06F 16/90332; G06N 3/0475; G06N 3/042; G10L 15/183; G10L 15/22
See application file for complete search history.

(56) References Cited

U.S. PATENT DOCUMENTS

2003/0208369 A1* 11/2003 Chamberlain ......... G06Q 30/02
705/1.1
2025/0094455 A1* 3/2025 Bista .................. G06F 16/3329
2025/0132038 A1* 4/2025 Ely ....................... G16H 15/00

* cited by examiner

*Primary Examiner* — Yicun Wu
(74) *Attorney, Agent, or Firm* — Jones Day

(57) ABSTRACT

Large language models (LLMs) are leveraged in order to dynamically generate webpages and to modify pre-existing webpages. The LLMs determine the intent of queries and modification requests and obtain relevant content using differently defined page generation strategies. Related apparatus, systems, techniques and articles are also described.

30 Claims, 16 Drawing Sheets

600

Tokyo trip 5 days

Generated by deep_dive_search

Tokyo 5-Day Itinerary

Planning a 5-day trip to Tokyo can be exciting and overwhelming. Here is a detailed itinerary to help you make the most of your time in this vibrant city. This ultimate Tokyo itinerary suggests spending a minimum of 5 days in Tokyo to fully experience the city's incredible offerings. The itinerary covers various aspects of Tokyo, from modern attractions to traditional experiences, ensuring a well-rounded trip .

Generated with sparks and insights from 6 sources

610

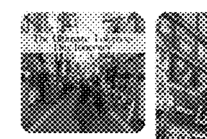

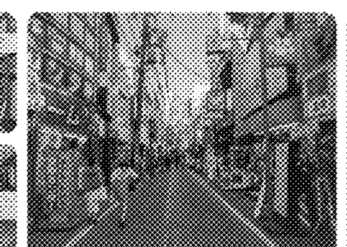

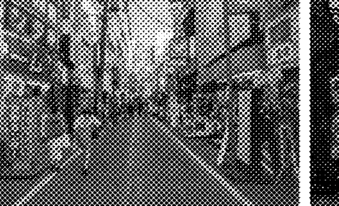

Day 1: Modern Tokyo/West Side

Begin your exploration by visiting modern Tokyo on the west side. Consider starting your day in Roppongi and exploring the vibrant nightlife in the district .

Day 3: Day Trip Outside of Tokyo

Take a break from the city and embark on a day trip to Nikko, Kamakura, or Mt. Fuji. These destinations offer a glimpse into Japan's rich culture and natural beauty, providing a refreshing contrast to the bustling city life .

Day 4: Imperial Palace Area and Shinjuku

Explore the Imperial Palace Area and Shinjuku on the fourth day of your trip. Visit iconic landmarks, enjoy local cuisine, and immerse yourself in the vibrant atmosphere of Shinjuku

Day 5: A Closer Look and Some Shopping

On the final day, take a leisurely approach to your itinerary. Explore residential areas like Ebisu, Daikanyama, and Meguro, and indulge in some souvenir shopping. This day allows for a more relaxed exploration of Tokyo before concluding your trip .

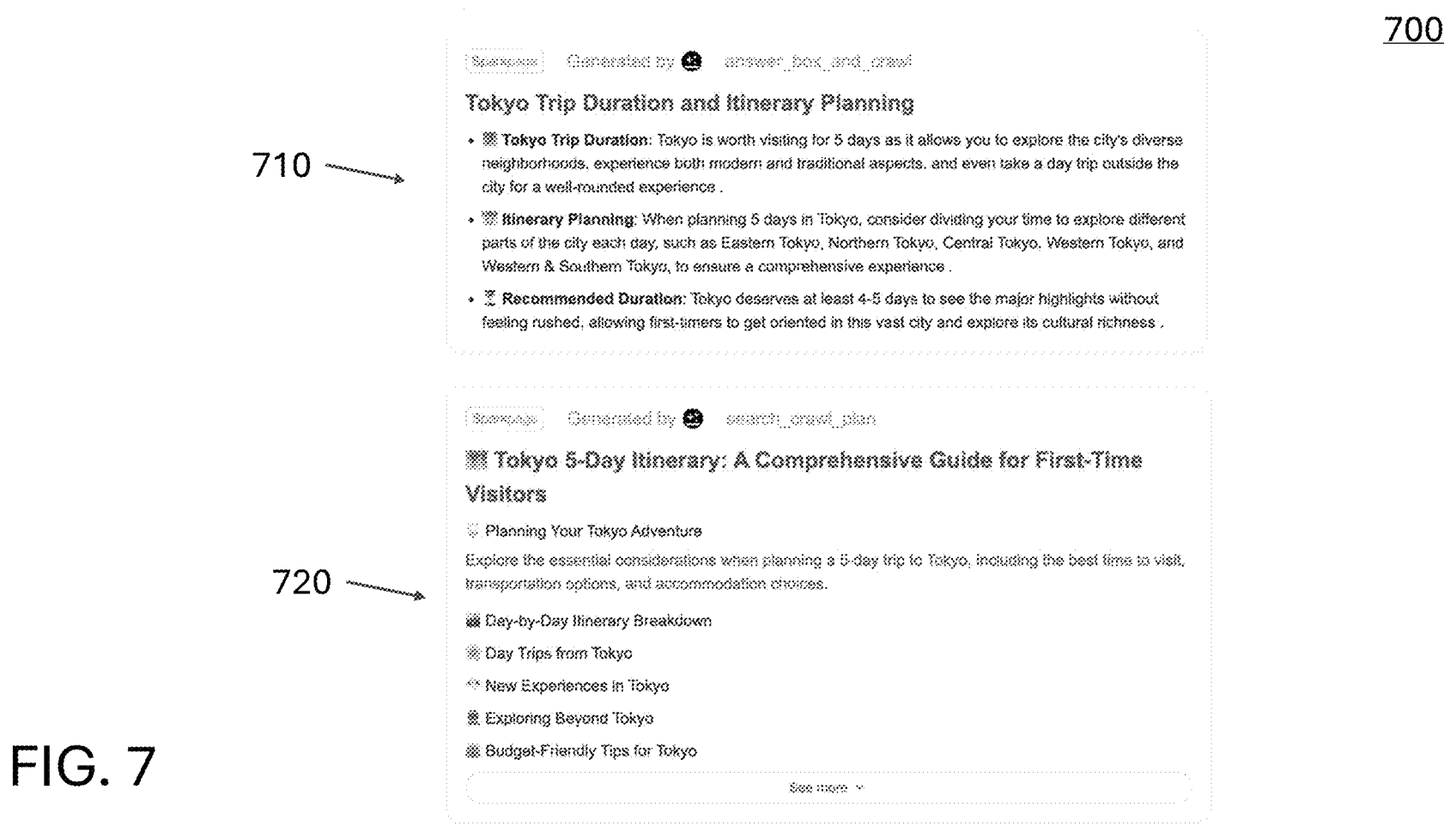

Generated by answer_box_and_crawl

Tokyo Trip Duration and Itinerary Planning

- Tokyo Trip Duration: Tokyo is worth visiting for 5 days as it allows you to explore the city's diverse neighborhoods, experience both modern and traditional aspects, and even take a day trip outside the city for a well-rounded experience .
- Itinerary Planning: When planning 5 days in Tokyo, consider dividing your time to explore different parts of the city each day, such as Eastern Tokyo, Northern Tokyo, Central Tokyo, Western Tokyo, and Western & Southern Tokyo, to ensure a comprehensive experience .
- Recommended Duration: Tokyo deserves at least 4-5 days to see the major highlights without feeling rushed, allowing first-timers to get oriented in this vast city and explore its cultural richness .

720

Generated by search_crawl_plan

Tokyo 5-Day Itinerary: A Comprehensive Guide for First-Time Visitors

Planning Your Tokyo Adventure

Explore the essential considerations when planning a 5-day trip to Tokyo, including the best time to visit, transportation options, and accommodation choices.

Day-by-Day Itinerary Breakdown

Day Trips from Tokyo

New Experiences in Tokyo

Exploring Beyond Tokyo

Budget-Friendly Tips for Tokyo

See more

FIG. 7

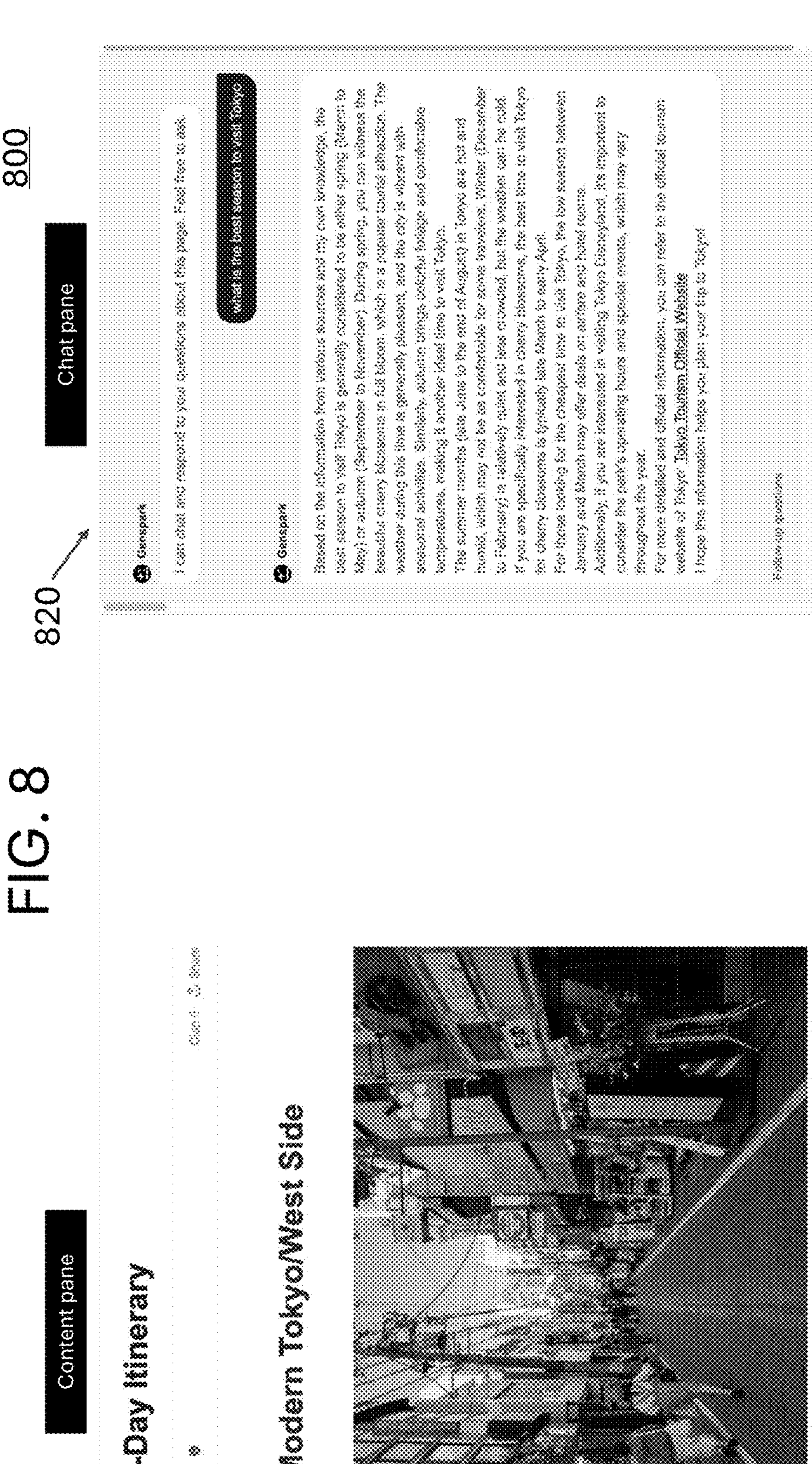
FIG. 8
800
810
Content pane
820
Chat pane
Tokyo 5-Day Itinerary
Day 1: Modern Tokyo/West Side
undefined
The Ultimate Tokyo 5-Day Itinerary ... (Source)
Welcome to the vibrant city of Tokyo! Your 5-day adventure begins with exploring modern Tokyo on the west side, offering a perfect blend of contemporary attractions and cultural experiences.
Genspark
I can chat and respond to your questions about this page. Feel free to ask.
what is the best season to visit Tokyo
Genspark
Based on the information from various sources and my own knowledge, the best season to visit Tokyo is generally considered to be either spring (March to May) or autumn (September to November). During spring, you can witness the beautiful cherry blossoms in full bloom, which is a popular tourist attraction. The weather during this time is generally pleasant, and the city is vibrant with seasonal activities. Similarly, autumn brings colorful foliage and comfortable temperatures, making it another ideal time to visit Tokyo.
The summer months (late June to the end of August) in Tokyo are hot and humid, which may not be as comfortable for some travelers. Winter (December to February) is relatively quiet and less crowded, but the weather can be cold. If you are specifically interested in cherry blossoms, the best time to visit Tokyo for cherry blossoms is typically late March to early April.
For those looking for the cheapest time to visit Tokyo, the low season between January and March may offer deals on airfare and hotel rooms.
Additionally, if you are interested in visiting Tokyo Disneyland, it's important to consider the park's operating hours and special events, which may vary throughout the year.
For more detailed and official information, you can refer to the official tourism website of Tokyo: Tokyo Tourism Official Website
I hope this information helps you plan your trip to Tokyo!
Follow-up questions
Is it worth going to Tokyo for 5 days?

Figure 11:
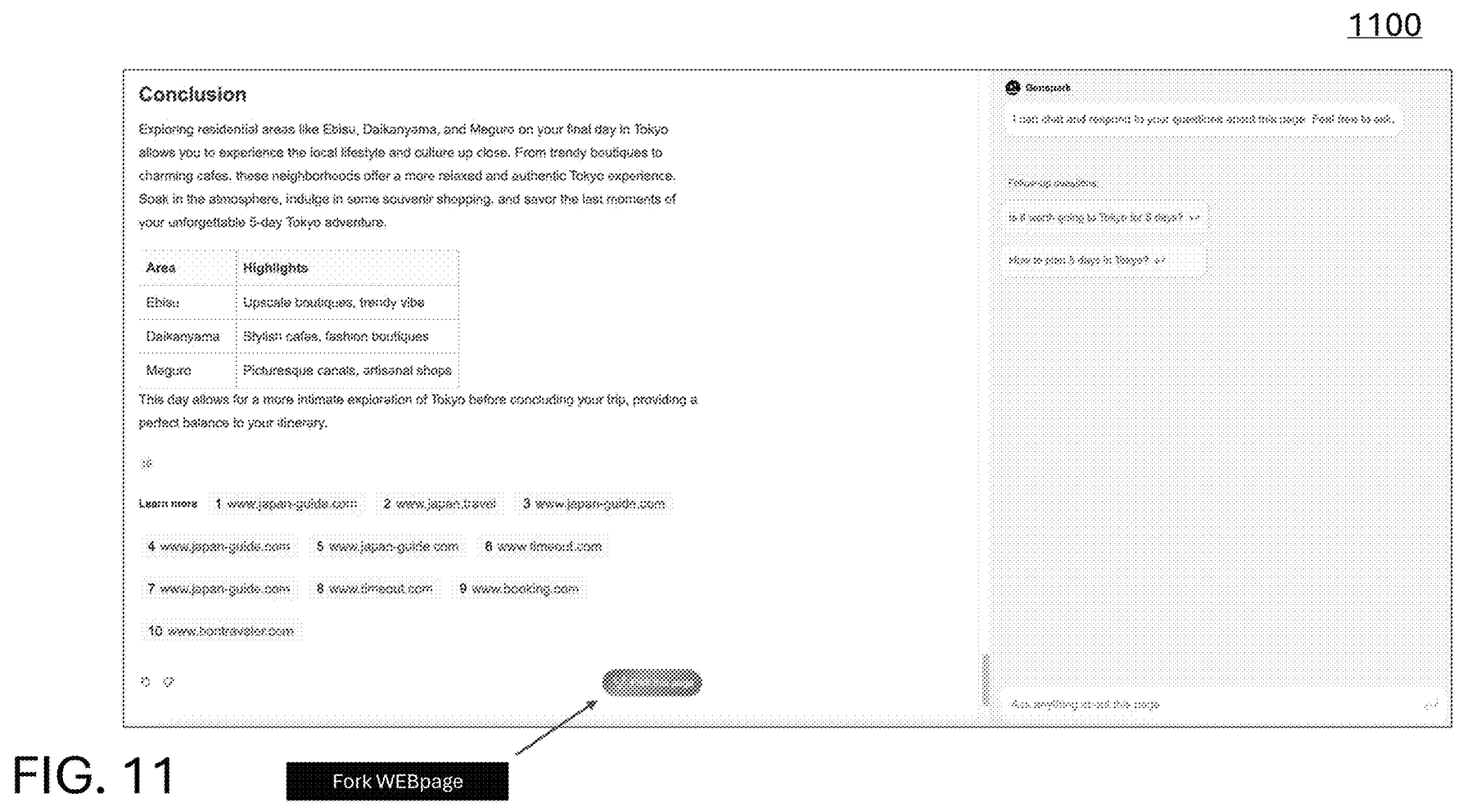

1100

Conclusion

Exploring residential areas like Ebisu, Daikanyama, and Meguro on your final day in Tokyo allows you to experience the local lifestyle and culture up close. From trendy boutiques to charming cafes, these neighborhoods offer a more relaxed and authentic Tokyo experience. Soak in the atmosphere, indulge in some souvenir shopping, and savor the last moments of your unforgettable 5-day Tokyo adventure.

| Area | Highlights |
| --- | --- |
| Ebisu | Upscale boutiques, trendy vibe |
| Daikanyama | Stylish cafes, fashion boutiques |
| Meguro | Picturesque canals, artisanal shops |

This day allows for a more intimate exploration of Tokyo before concluding your trip, providing a perfect balance to your itinerary.

Learn more 1 www.japan-guide.com 2 www.japan.travel 3 www.japan-guide.com 4 www.japan-guide.com 5 www.japan-guide.com 6 www.timeout.com 7 www.japan-guide.com 8 www.timeout.com 9 www.booking.com 10 www.bontraveler.com I can chat and respond to your questions about this page. Feel free to ask.

Follow-up questions:

Is it worth going to Tokyo for 5 days?

How to plan 5 days in Tokyo?

Ask anything about this page

Fork WEBpage

Fork WEBpage

FIG. 13
Tokyo 7-Day Itinerary with Kids: Exploring Museums and Family-Friendly Attractions
Day 1: Arrival and Family-Friendly Tokyo Exploration

1300

New WEBpage

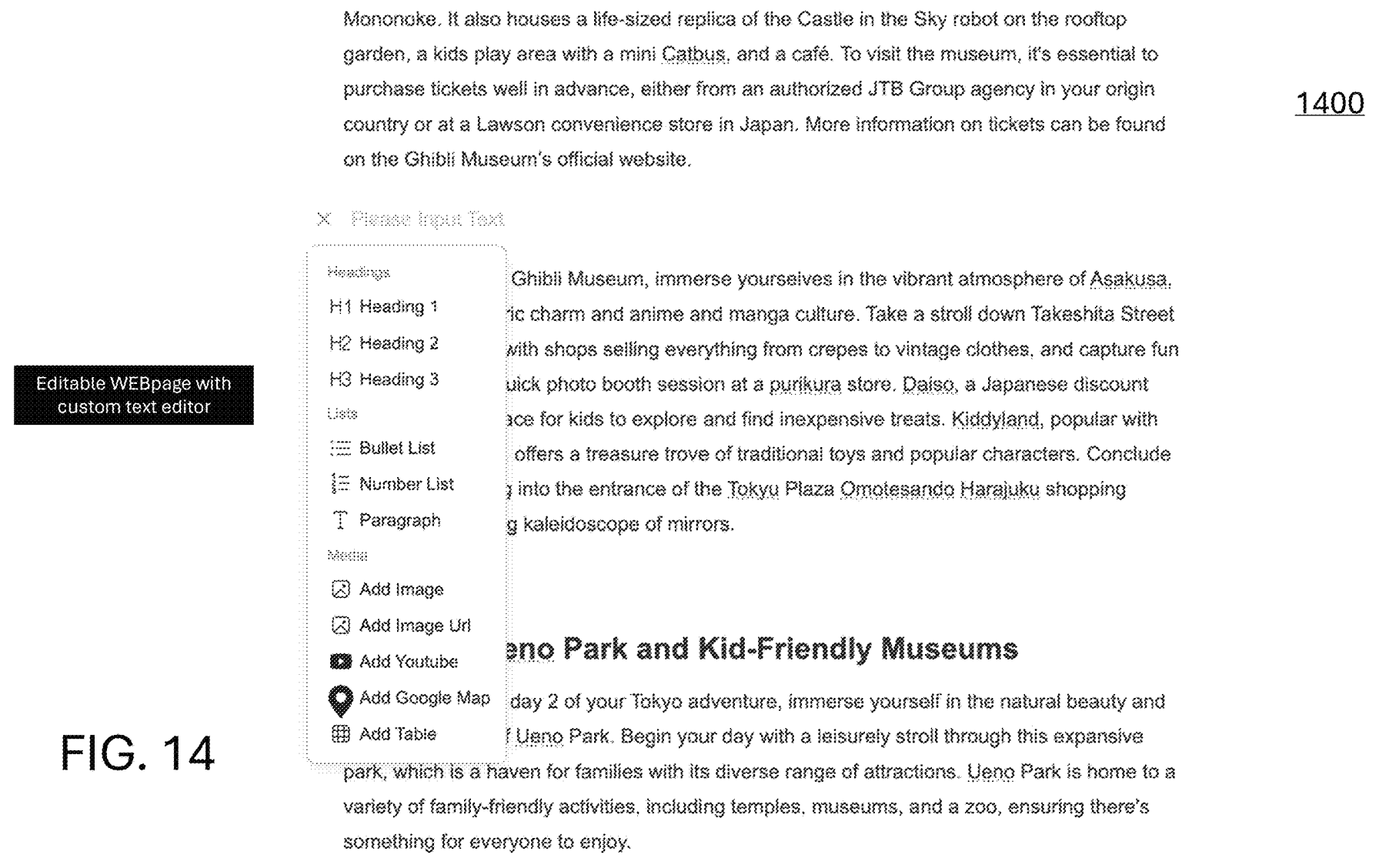

1400

Mononoke. It also houses a life-sized replica of the Castle in the Sky robot on the rooftop garden, a kids play area with a mini Catbus, and a café. To visit the museum, it's essential to purchase tickets well in advance, either from an authorized JTB Group agency in your origin country or at a Lawson convenience store in Japan. More information on tickets can be found on the Ghibli Museum's official website.

× Please Input Text

Headings
H1 Heading 1
H2 Heading 2
H3 Heading 3
Lists
Bullet List
Number List
Paragraph
Media
Add Image
Add Image Url
Add Youtube
Add Google Map
Add Table Ghibli Museum, immerse yourselves in the vibrant atmosphere of Asakusa, ric charm and anime and manga culture. Take a stroll down Takeshita Street with shops selling everything from crepes to vintage clothes, and capture fun uick photo booth session at a purikura store. Daiso, a Japanese discount ace for kids to explore and find inexpensive treats. Kiddyland, popular with offers a treasure trove of traditional toys and popular characters. Conclude into the entrance of the Tokyu Plaza Omotesando Harajuku shopping g kaleidoscope of mirrors.

eno Park and Kid-Friendly Museums day 2 of your Tokyo adventure, immerse yourself in the natural beauty and f Ueno Park. Begin your day with a leisurely stroll through this expansive park, which is a haven for families with its diverse range of attractions. Ueno Park is home to a variety of family-friendly activities, including temples, museums, and a zoo, ensuring there's something for everyone to enjoy.

Editable WEBpage with custom text editor

FIG. 14

WEBPAGE CREATION LEVERAGING GENERATIVE AI

TECHNICAL FIELD

The subject matter described herein relates to techniques for dynamically generating and personalizing webpages leveraging advanced artificial intelligence such as large language models.

BACKGROUND

Search engines, which require indexed information, can sometimes be difficult to use for complex or nuanced queries given that they are designed to provide results responsive to inputted keywords. Not only are results ranked according to criteria set by the respective search engine, but they may not always accurately reflect the underlying intent of the query. As such, a user may have to traverse many results to find the desired content thereby making for a less than desirable user experience.

SUMMARY

In a first aspect, a user-generated query (e.g., prompt) is received. Thereafter, it is determined, using a large language model (LLM), an intent of the query. The LLM then modifies the query based on the determined intent to result in a contextualized query. The contextualized query can specify which data sources (e.g., search engines, repositories, other LLMs, etc.) from which to obtain content and, in some variations, additionally specify content type (text, images, video, sound, etc.). An Internet search is then performed to receive content responsive to the contextualized query. At least one webpage responsive to the user-generated query is dynamically generated by the LLM based on the received content responsive to the contextualized query.

There can be a plurality of different webpages generated by the LLM which are responsive to the user-generated query. Each different webpage can be generated using a different page strategy. In some variations, multiple different page strategies can be used to populate a single webpage.

The page generation strategies can be generated by inputting the contextualized query into the LLM. The page generation strategies can specify content types and layout for the corresponding webpage. The page generation strategies can specify sources to search to populate content in the corresponding webpage.

The received content responsive to the contextualized query can be input into the LLM. The resulting output from the LLM (e.g., improved content, summarized content, etc.) can be used to populate one of the dynamically generated webpages. In some cases, pre-existing dynamically-generated webpages can be searched for content responsive to the contextualization query. Matching and/or responsive content from these pre-existing dynamically-generated webpages can be used for the newly generated at least one webpage.

In some variations, the LLM can be used to determine follow up questions to content in the at least one webpage. The LLM can then generate additional content based on the determined follow up questions and the at least one webpage can be enriched with such additional content. In some cases, the additional content can be conveyed or otherwise made available in a dedicated AI-copilot chat frame. In some cases, the LLM can determine that an Internet search for content responsive to the follow up questions is required. The LLM, in response, can generate one or more follow up question queries and perform a second Internet search to receive content responsive to the one or more follow up question queries. The at least one webpage can be enriched with content generated by the LLM based on the second Internet search (whether in the content pane, chat pane, or elsewhere).

In an interrelated aspect, a user-generated request is received to initiate forking of an existing webpage. An LLM is used to determine an intent of the request. A query is generated based on the determined intent. This query may specify aspects such as data sources (e.g., search engines, repositories, other LLMs, etc.) to poll and/or content data types to obtain (e.g., text, images, video, audio, etc.). The data sources can be available through the Internet such that an Internet search can be performed to receive content responsive to the query. Thereafter, the LLM, based on the received content responsive to the query, dynamically modifies and/or enriches the existing webpage to result in a modified webpage.

The LLM, based on the modified webpage, can determine at least one follow up question associated with the request. The modified webpage can be supplemented based on the at least one follow up question associated with the request. This supplement can be based on a further output generated by the LLM (i.e., complementary information, etc.) and/or it can be based on a subsequent Internet search (using a query as generated by the LLM).

The browser interface displaying the modified webpage can be configured to allow the user (by way of user-generated input) to change or otherwise modify content displayed therein. In some cases, the editing and other supplementing of the modified webpage can be performed prior to the modified webpage being published (i.e., made available to the Internet, etc.). In some cases, the modified webpage is embargoed (i.e., not available on the Internet, etc.) for a pre-defined time period and/or until content analyses can be conducted. For example, a policy-based approach can be used to analyze the modified webpage to determine whether it contains unauthorized or prohibited content. In such cases, the unauthorized or prohibited content can be deleted or redacted. In some cases, the identification of unauthorized or prohibited content will prevent the modified webpage from being published at all.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques leveraging artificial intelligence for dynamically generating and modifying webpages based on user intent.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 6 is a first user interface view illustrating aspects of a webpage;

FIG. 7 is a second user interface view illustrating aspects of a webpage;

FIG. 8 is a user interface view illustrating aspects of a webpage with a content pane and a chat pane;

FIG. 11 is a first user interface view illustrating aspects of a workflow for forking a webpage;

FIG. 14 is a fourth user interface view illustrating aspects of a workflow for forking a webpage;

DETAILED DESCRIPTION

The current subject matter is directed to advanced techniques for dynamically generating and modifying online content based on user-defined intent. This online content is referred to herein as a webpage. In particular, the current subject matter utilizes artificial intelligence (AI) such as generative AI (GenAI) models (e.g., transformer model architectures, large language models, etc.) in order to provide an enhanced and on-the-fly user search experience.

Figure 1:
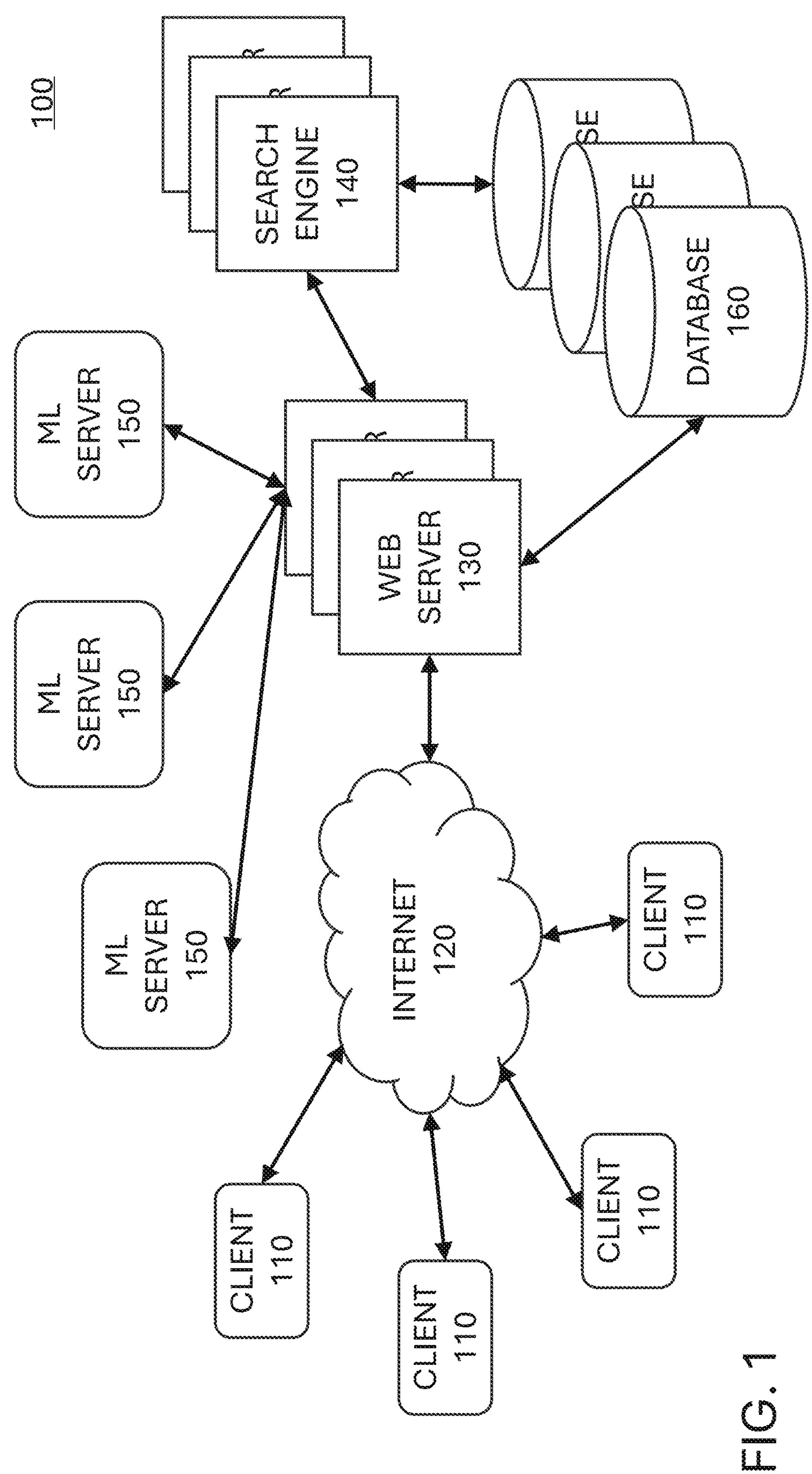
FIG. 1 is a diagram illustrating a sample computing architecture for implementing aspects of the current subject matter.

With reference to diagram 100 of FIG. 1, an architecture for implementing the current subject matter can include a plurality of client devices 110 (e.g., mobile phones, tablets, laptops, desktops, IoT devices, etc.) which interact, by way of the Internet 120, with one or more web servers 130 which, in turn, can communicate with servers executing search engines 140 and one or more ML servers 150 executing machine learning models (e.g., large language models, etc.) as well as databases 160 (which can, for example, store webpages as described below).

Figure 2:
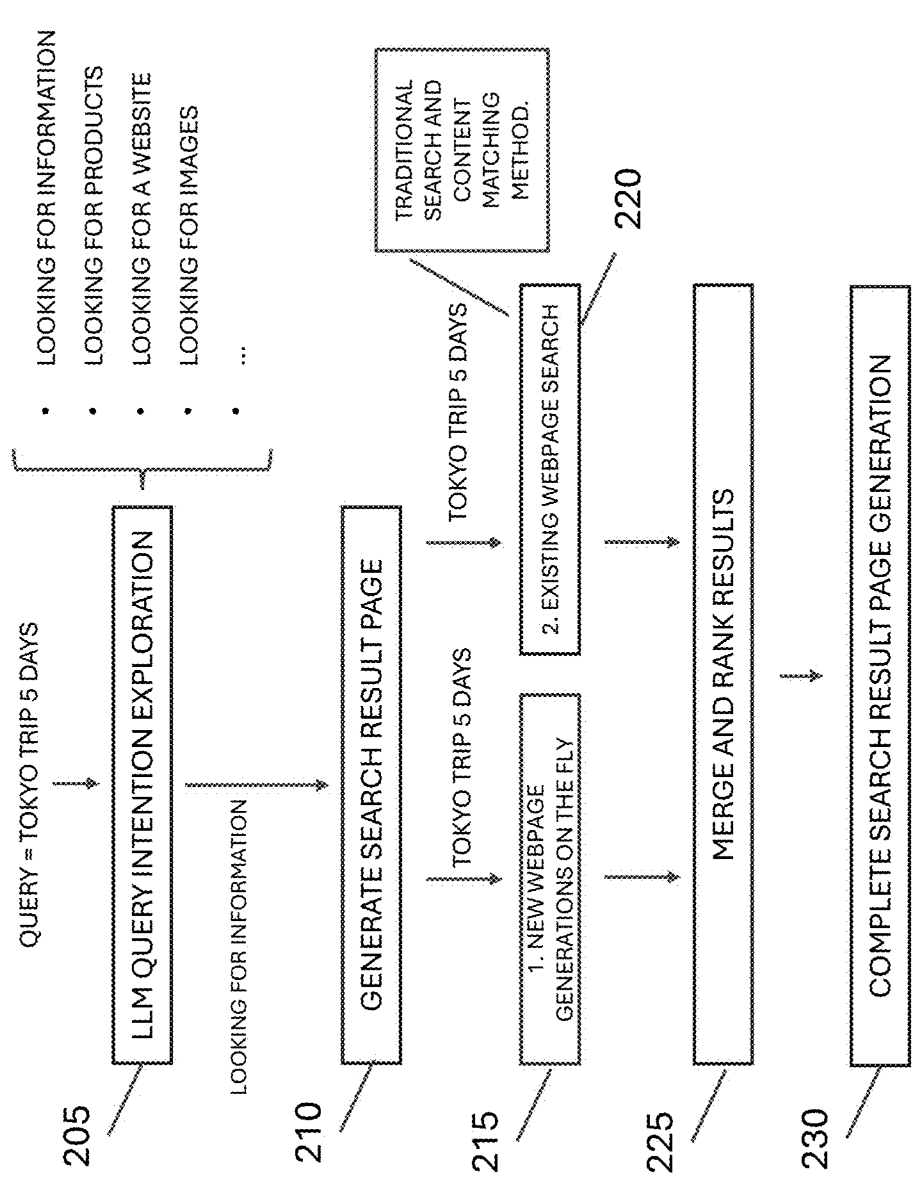
FIG. 2 is a process flow diagram illustrating the generation of a search results webpage.

FIG. 2 is a diagram 200 illustrating a sample workflow for dynamically generating webpages in which a user-specified query 205 (e.g., "Tokyo Trip 5 Days", etc.) is received and ingested, at 210, by a large language model (LLM) to determine an intent of the query. The LLM can take various forms including GPT-4, LLAMA, Mistral 7B, Claude, FALCON, BLOOM, LaMDA, MT-NLG, Alpaca, and more. The LLM can determine which of a plurality of pre-defined or defined-on-the fly intent categories the query belongs to such as seeking information, seeking products, seeking a website, seeking images, and the like. The LLM then modifies the query to reflect the intent categories (i.e., a contextualized query is generated) and polls (e.g., Tokyo 5 days itinerary and sight-seeing) to generate, at 215, a search result page. The contextualized query can specify which data sources (e.g., search engines, other LLMs, etc.) from which to obtain content and, in some variations, additionally specify content type (text, images, video, sound, etc.). The search result page can be used, in parallel, to dynamically generate, at 220, a new webpage responsive to the query 205 (using, for example, the workflow in diagram 300 of FIG. 3). This new webpage comprises a new form of webpage feature in a built-in AI copilot in which users can free chat and ask questions related to the content on the webpage. In addition, existing webpages can be searched to find content matching the query 205. Thereafter, the new webpage and the matching existing webpages can, at 225, be merged from which, at 230, a search result page can be generated. In some cases, the content in the merged webpage can be ranked based on responsiveness to the query 205. In some variations, the results in the search result page can be truncated to fit only a certain amount of content and/or number of responsive entries. Other user interface options to convey the content responsive to the query 205 can be provided depending on the desired implementation.

Figure 3:
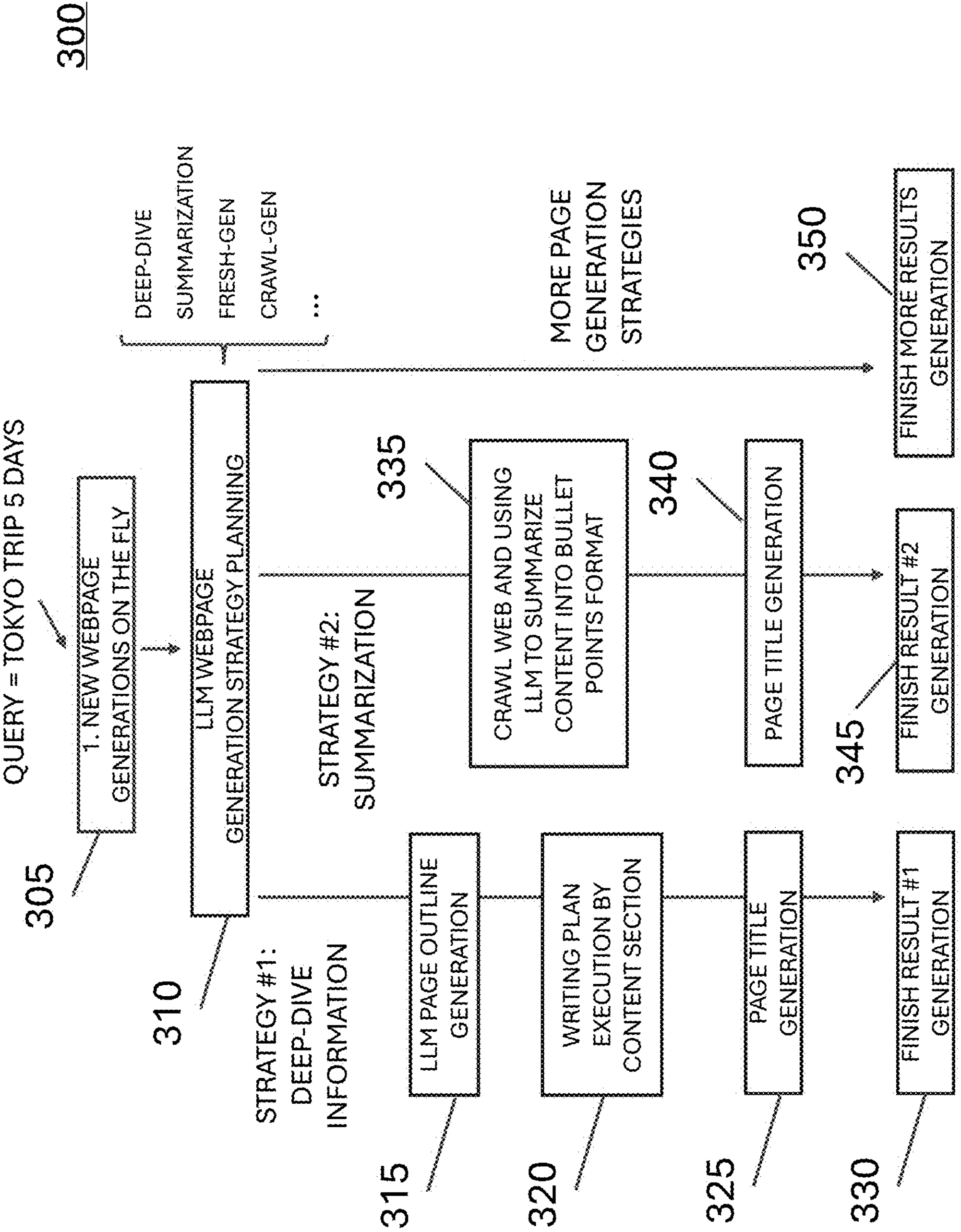
FIG. 3 is a process flow diagram illustrating a multi-strategy workflow for generating a webpage.

FIG. 3 is a diagram 300 illustrating a process flow for on-the-fly generation of a webpage. The process starts at 305 in which a user-generated query or LLM-enhanced query is received so that, at 310, an LLM using such query in combination with webpage generation strategy instructions. Example instructions can include "prepare a high level outline of trip itinerary", "locate videos about each sight or attraction", "determine required travel times", etc. The webpage generation strategy instructions can define a plurality of different instruction sets in order to generate the webpage. These instructions can define how content is obtained for the webpage and/or specifications for a user interface for conveying the results to the user. As an example, a first strategy can be referred to as a deep-dive information strategy. Initially, at 315, the LLM can, responsive to the instructions, generate a webpage outline which can define things such as the layout of the webpage (e.g., content sections, images, videos, etc.), writing plan (e.g., content types, content sources, etc.) and page title. Thereafter, at 320, the LLM is used to generate content according to the writing plan on a section-by-section basis. In addition, at 325, the page title is generated which results, at 330, with a first webpage. Each different webpage generation strategy can have differing workflows. For example, with regard to a summarization strategy, at 335, the web is crawled (for example, one or more search engines is queried) and the LLM summarizes the content (e.g., into bullet points, etc.) and, at 340, generates a page title to end up with a second webpage 345. Additional, strategies can be implemented such as fresh generation (i.e. generate new content on-the-fly using LLM output without externally sourced content, etc.), crawl generation (i.e., obtain information from the web and have the LLM rewrite, summarize or enrich, etc.) to result in, at 350, one or more additional webpages. With reference to diagrams 600, 700 of FIGS. 6 and 7, a first strategy can result in content such as illustrated in the user interface view 610 in FIG. 6, a second strategy can result in content as illustrated in the user interface view 710 in FIG. 7, and a third strategy can result in content as illustrated in the user interface view 720 in FIG. 7.

Figure 4:
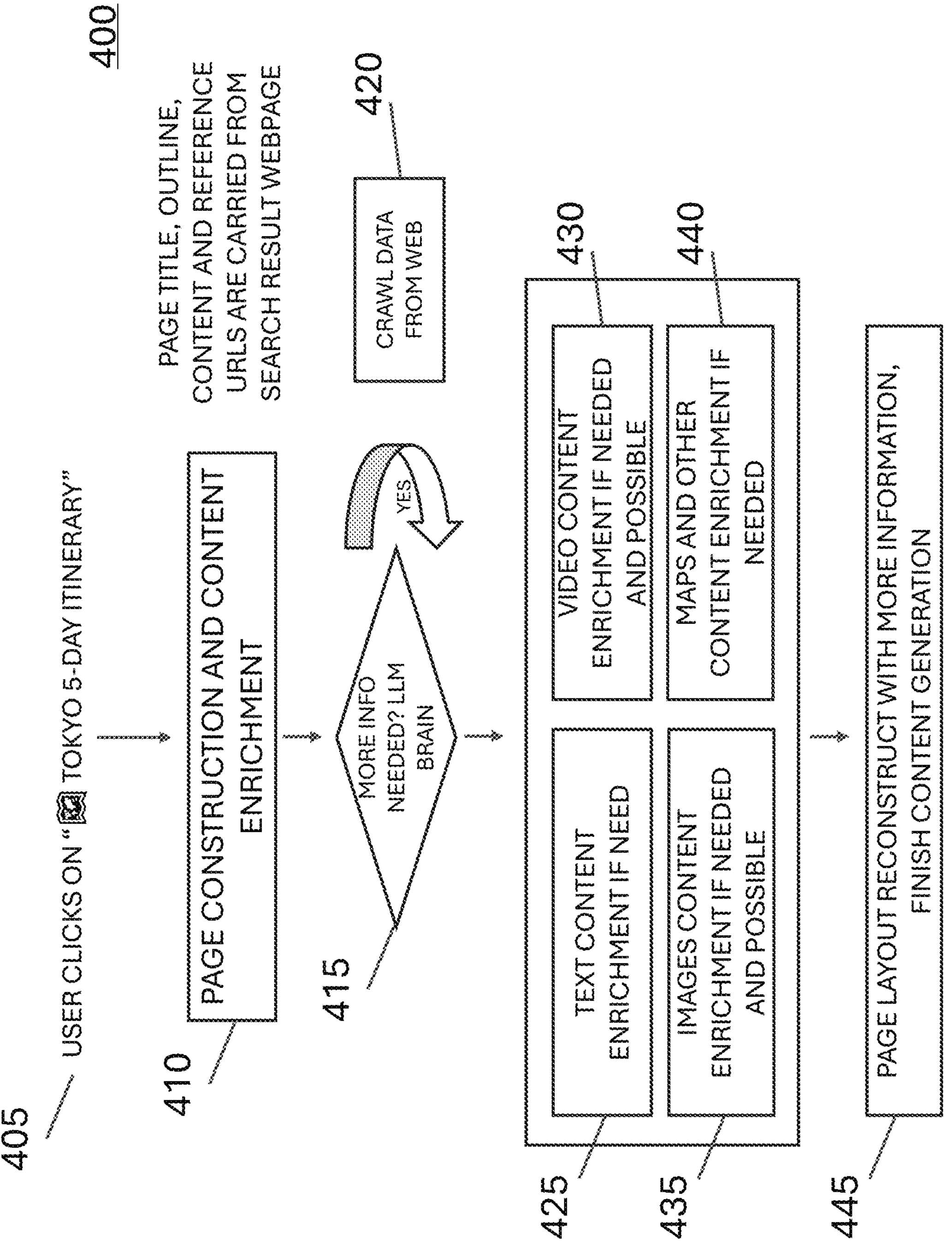
FIG. 4 is a process flow diagram illustrating techniques for enriching a webpage.

FIG. 4 is a process flow diagram 400 for enriching, for example, an existing webpage (or a subsection thereof) in response to a user selecting a particular graphical user interface (GUI) element. In this example, at 405, the user clicks on a GUI element corresponding to results for a Tokyo 5-Day Itinerary such as displayed in FIG. 6. Thereafter, at 410, the LLM, using information from the previous webpage such as page title, outline, content, and reference URLs, constructs a new webpage and enriches the previous content. In some cases, at 415, the LLM can make a determination as to whether additional information is needed. For example, the LLM can determine whether the question is beyond the scope of the content in the current page or the current page does not answer the question. If more information is needed, the LLM can generate one or more queries seeking additional content from the web. The content utilized in the enriched webpage can take differing forms including text content 425, video content 430, images 435, as well as other content such as maps, weather information, and the like. With this additional information, at 445, the LLM can finalize the new page layout and enrich or otherwise supplement it to result in a modified webpage.

Figure 5:
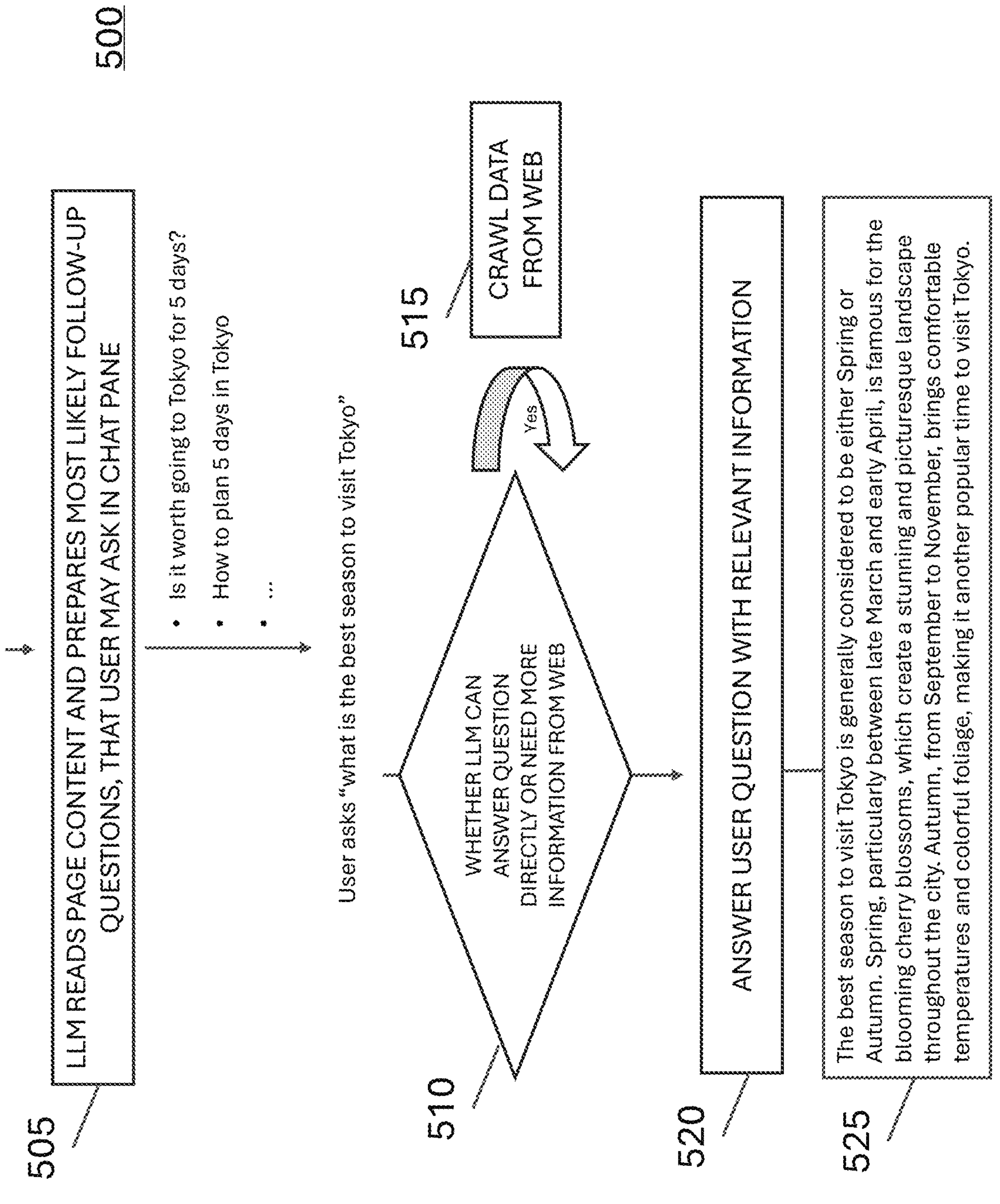
FIG. 5 is a second process flow diagram illustrating techniques for enriching a webpage.
Figure 9:
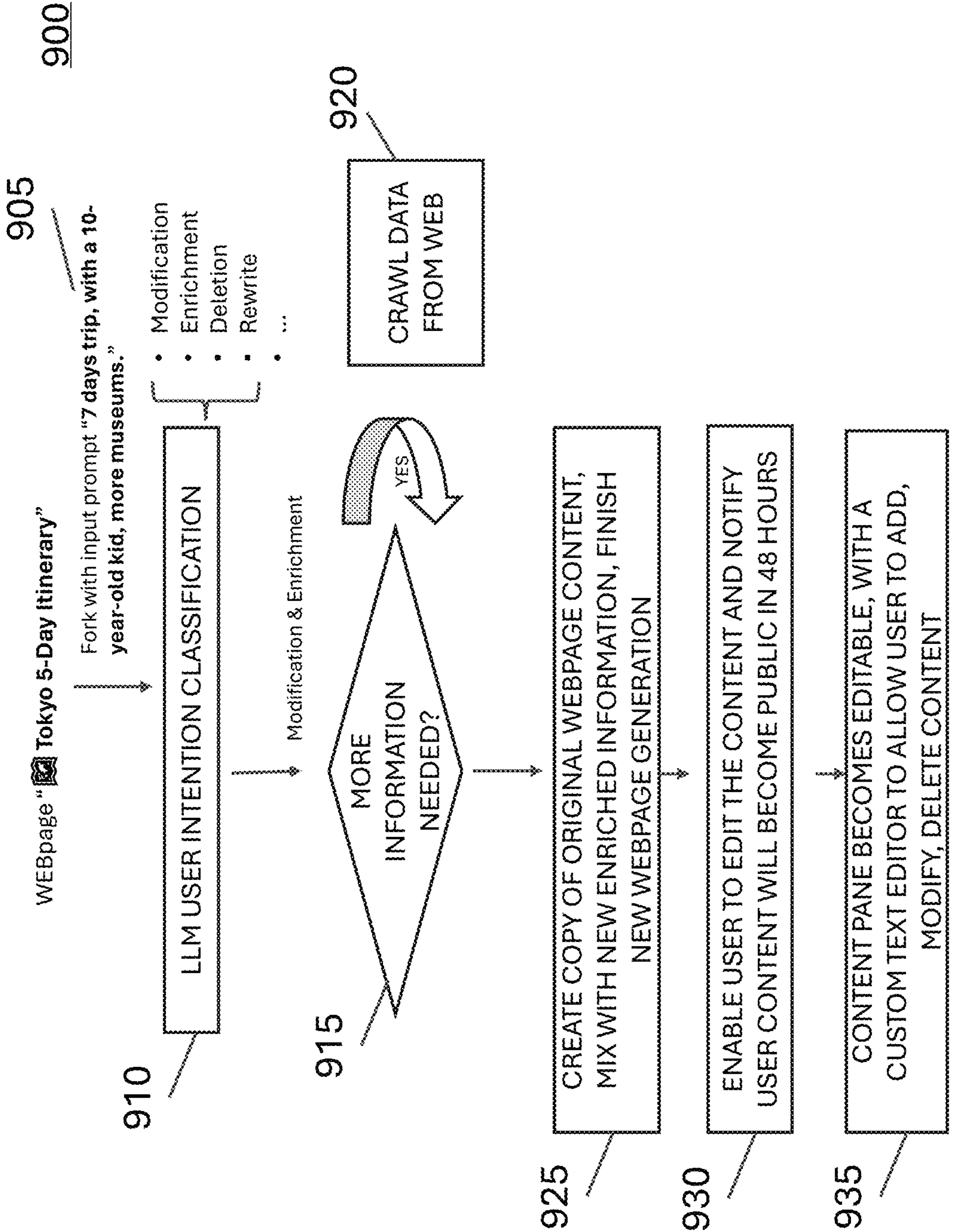
FIG. 9 is a process flow diagram illustrating techniques for forking a webpage to result in a new webpage.

FIG. 5 is a process flow diagram 500 illustrating an additional technique for enriching a webpage. In this example, at 505, the LLM reads the content of a webpage and determines most likely follow up questions. The webpages can take differing forms and include different graphical user interface elements such as, with reference to FIG. 8, a webpage can include a content pane 810 in tandem with a chat pane 820 in which follow up questions can be entered by and/or displayed to the user. This chat pane can be referred to as an AI-based copilot in which users can ask questions and receive answers powered by the LLM (whether enriched with external data such as from the web or otherwise). In this example, the LLM generates a follow up question of "what is the best season to visit Tokyo". The LLM then, at 510, determines whether it can adequately answer the follow or if additional information is needed from the web (similar to the processes in FIG. 4). With the latter, the LLM generates search engine queries so that data can be obtained from the web. The LLM then, at 520, determines which available content is most relevant to the follow up question and generates an answer 525 (which can be of one or more different modalities, namely text, images, video, sound, etc.).

Figure 12:
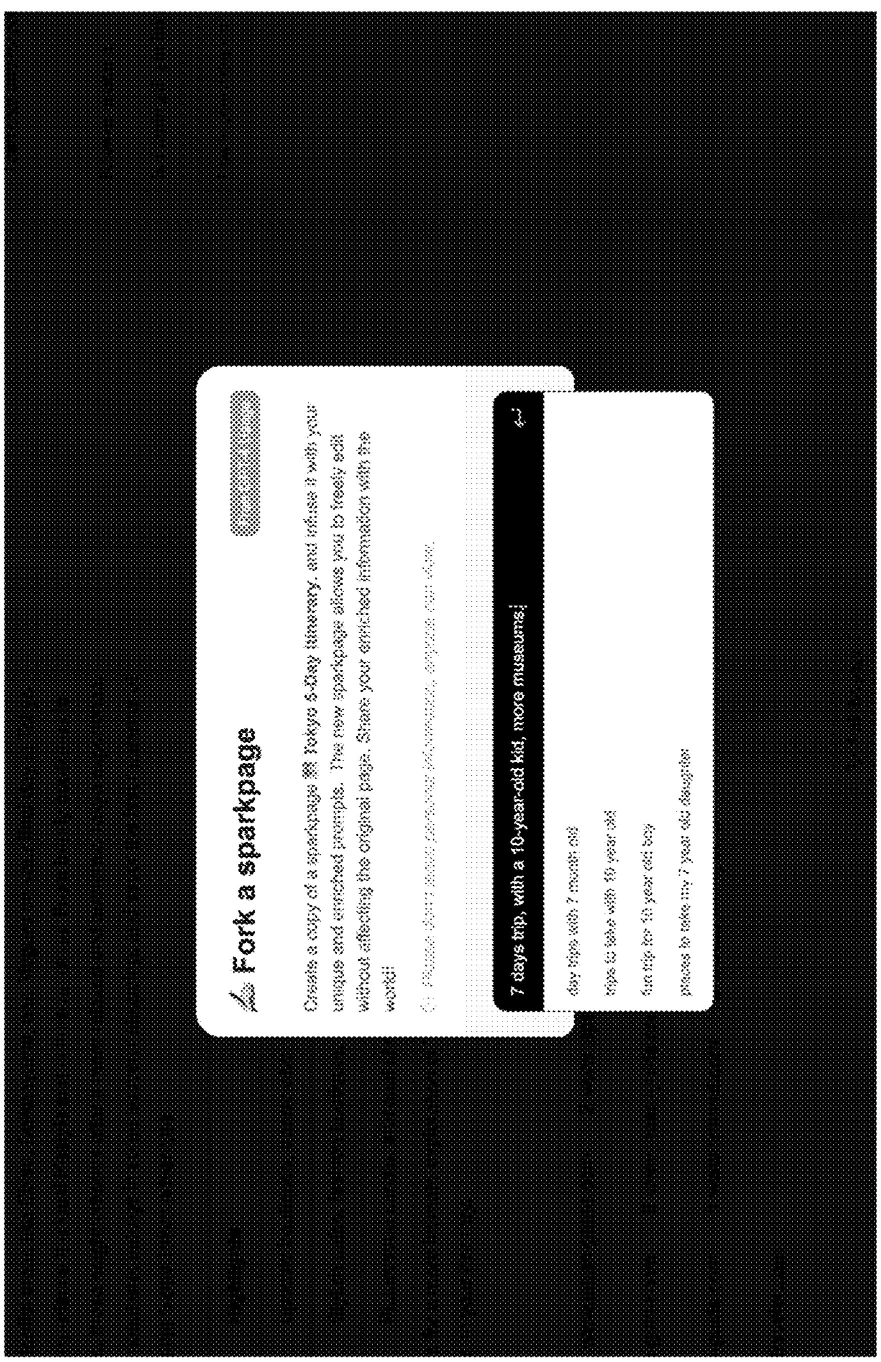
FIG. 12 is a second user interface view illustrating aspects of a workflow for forking a webpage.
Figure 13:
FIG. 13 is a third user interface view illustrating aspects of a workflow for forking a webpage.

In some cases, the modification of a webpage can result in a forked webpage. Forked webpage, in this context, means that both the original webpage and the modified webpage are available for subsequent access by users (depending on availability restrictions). In some variations, with reference to diagram 1100 of FIG. 11, a GUI element can be provided in the content pane (or elsewhere) to initiate the forking process. Continuing with the Tokyo 5-Day Itinerary webpage example, a user may enter a new query (sometimes referred to as a prompt) "7 days trip, with a 10-year-old kid, more museums". This additional prompt can be entered, for example, in the chat pane 810 and/or in response to activating the GUI element in FIG. 11 (as illustrated in diagram 1200 of FIG. 12). The LLM in response, at 910, determines the intent of prompt. The intent, for example, can be whether to modify the webpage, enrich the webpage, delete some or all of the webpage, or rewrite the webpage. The LLM, at 915, can determine whether there is sufficient information. If not, similar to earlier examples, the LLM generates queries so that, at 920, data can be obtained from various search engines (i.e., data is crawled from the web). The LLM, at 925, can create a copy of the original webpage content and mix it with enriched information (i.e., additional content generated by the LLM and/or obtained from the web crawling). In some variations, at 930, the content can be edited by the user, at 925, in the content pane (e.g., content pane 810) such as illustrated in diagrams 1300, 1400 of FIGS. 13-14. In addition, there may be guardrails applied to the new webpage such as a waiting time period before it becomes public (e.g., 48 hours, etc.). During this waiting time period, for example, the content of the new webpage can be analyzed through various content algorithms and according to predefined policies as to whether there are any aspects that need to be deleted, redacted, or if other remedial measures need to be taken (e.g., preventing the new webpage from being published or otherwise publicly available).

Figure 10:
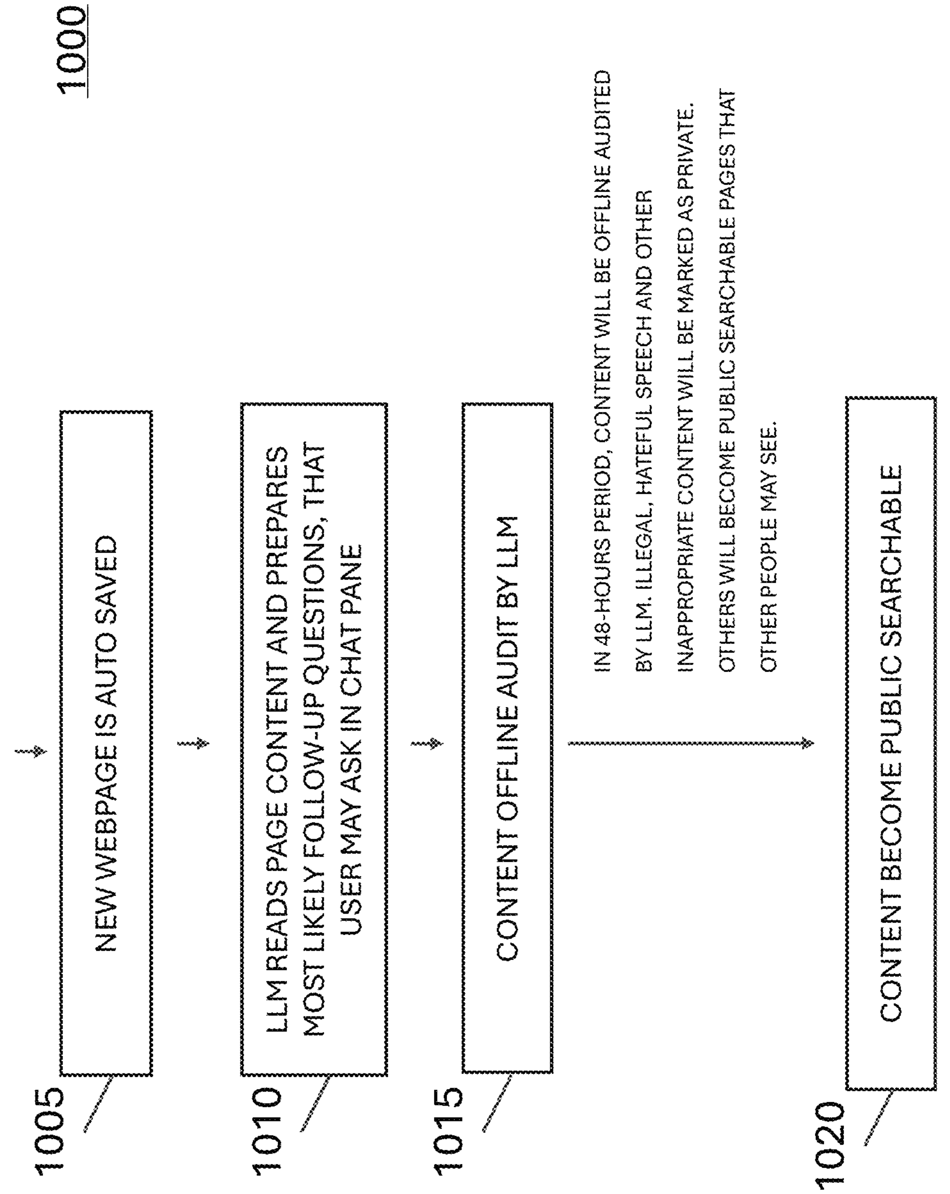
FIG. 10 is a process flow diagram illustrating pre-publication analyses and enrichment of a new webpage.

With reference to diagram 1000 of FIG. 10, at 1005, the modified webpage is auto saved. The LLM, at 1010, and similar to the processes specified above, ingests the content of the webpage and determines most likely follow up questions that might be asked in the chat pane. As with the process of FIG. 5, the LLM can obtain and/or generate new content for likely follow questions. In addition, at 1015, the content in the new webpage can be audited by the LLM. Different policies can be implemented such as flagging illegal content, hateful speech, or other inappropriate content. Remedial measures can be taken including, for example, making some or all of the webpage private, deleting or redacting some or all of the webpage and the like. In other words, in some cases, the LLM can determine whether to publish a webpage, and if so, whether any changes need to be implemented to the webpage prior to it, at 1020, becoming publicly available/searchable. These changes can be defined by one or more policies.

Figure 15:
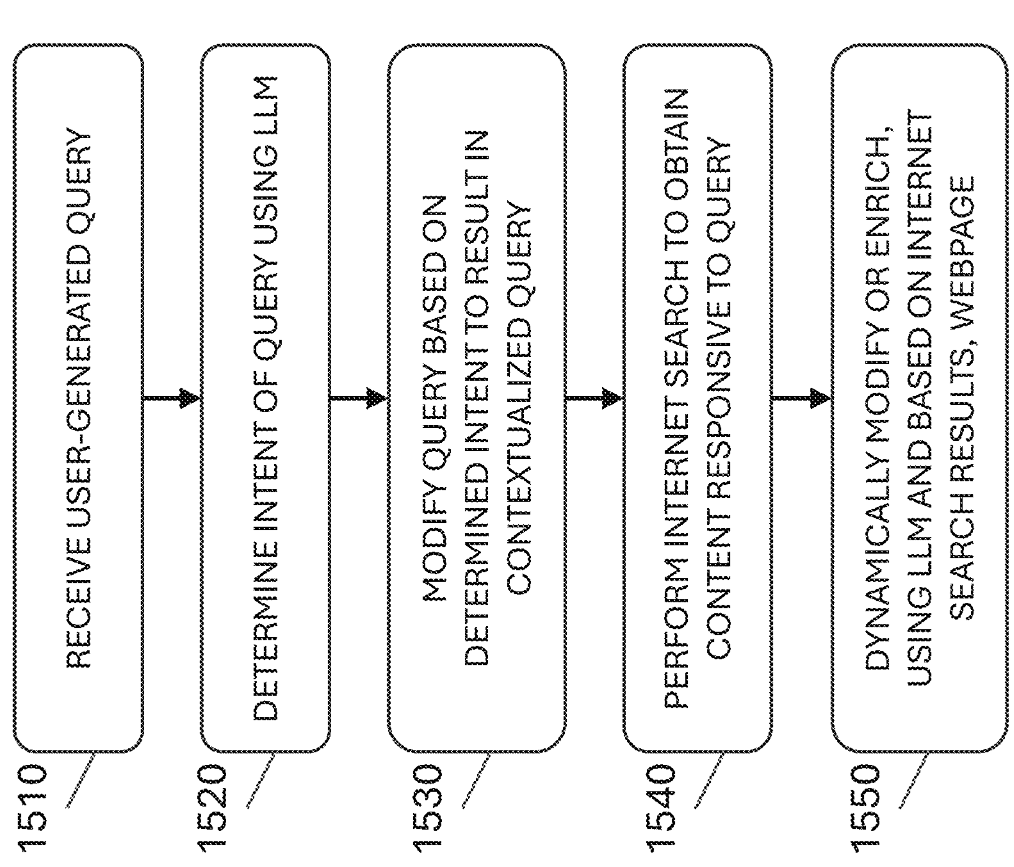
FIG. 15 is a process flow diagram illustrating a workflow for dynamic webpage generation leveraging one or more large language models.

FIG. 15 is a process flow diagram 1500 in which, at 1510, a user-generated query is received. Thereafter, at 1520, an intent of the query is determined using at least one large language models (LLM). The query is modified, at 1530, by the LLM to reflect the determined intent which then results in a contextualized query. This contextualized query used to perform, at 1540, an Internet search (e.g., poll search engines, crawl the web, etc.) to receive content responsive to the contextualized query. The LLM using the received content responsive to the contextualized query dynamically generates, at 1550, at least one webpage responsive to the user-generated query.

Figure 16:
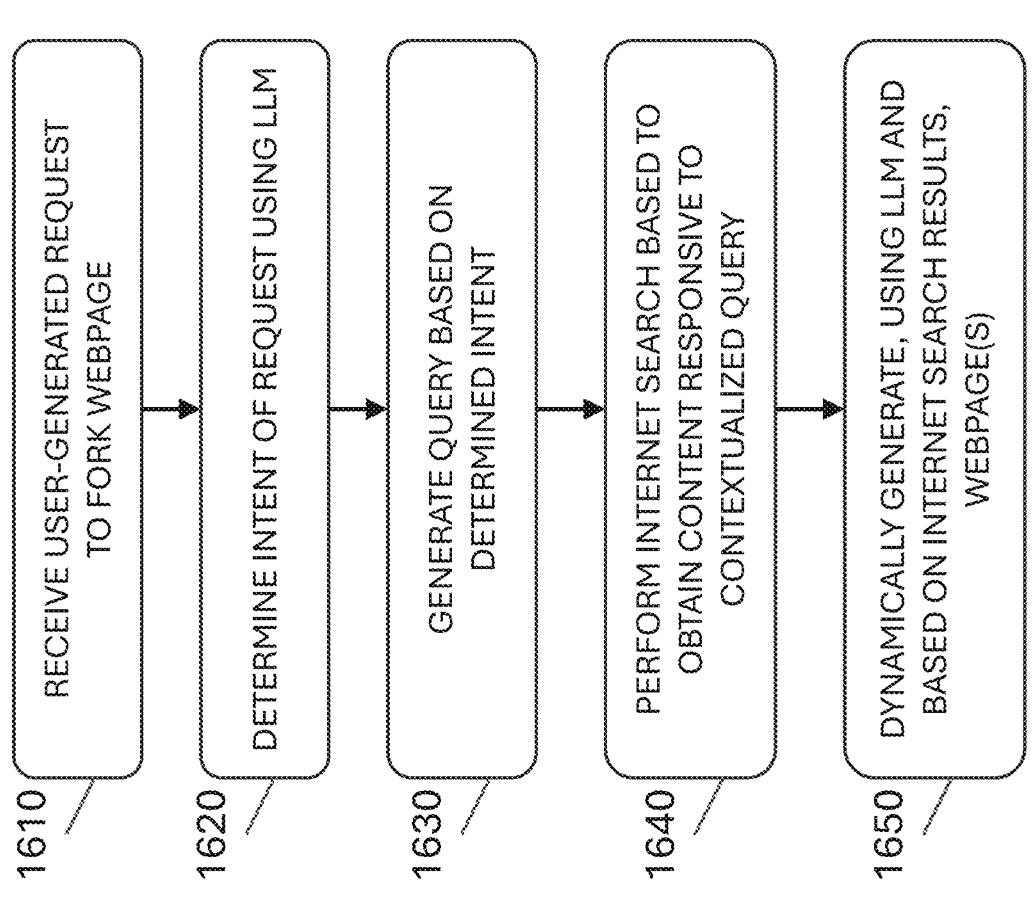
FIG. 16 is a process flow diagram illustrating a workflow for dynamic web page personalization leveraging one or more large language models.

FIG. 16 is a process flow diagram 1600 in which, at 1610, a user-generated request to initiate forking of an existing webpage is received. Thereafter, at 1620, a large language model (LLM) determines an intent of the request. A query is generated, at 1630, based on the determined intent. The query can specify data sources (e.g., search engines, repositories, other LLMs, etc.) and/or data content types to obtain relating to the request. This generated query, in turn, is used, at 1640 to performing an Internet search to receive responsive content. The LLM then, at 1650, dynamically modifies and/or enriches, based on the received responsive content, the existing webpage to result in a modified webpage.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:

receiving a user-generated request to initiate forking of an existing webpage;

determining, using a large language model (LLM), an intent of the request;

generating a query based on the determined intent;

performing an Internet search to receive content responsive to the query; and dynamically modifying and/or enriching, by the LLM and derived from the received content responsive to the query, the existing webpage to result in a modified webpage;

wherein: (i) forking maintains both the original webpage and the modified webpage available for subsequent access as separate webpages, each webpage having a distinct uniform resource locator (URL), (ii) the existing webpage and the modified webpage are presented in a browser interface that includes a content pane displaying webpage content and an AI copilot chat pane configured to receive natural language forking requests (iii) the dynamically modifying comprises parsing the original webpage content, creating a copy of the parsed original webpage content in a webpage data structure, and mixing the copy with LLM-generated content based on the Internet search to produce the modified webpage, and (iv) generating, by the LLM, a webpage layout for the modified webpage, the webpage layout defining content sections and content types for the modified webpage.

2. The method of claim 1 further comprising:

determining, by the LLM and based on the modified webpage, at least one follow up question associated with the request;

supplementing the modified webpage based on the determined at least one follow up question associated with the request.

3. The method of claim 2, wherein the modified webpage is supplemented by performing an Internet search.

4. The method of claim 2, wherein the modified webpage is supplemented by further querying the LLM for complementary information to the modified webpage.

5. The method of claim 1 further comprising:

receiving user-generated input changing content in the modified webpage.

6. The method of claim 5 further comprising:

publishing the modified webpage.

7. The method of claim 6 further comprising: embargoing the modified webpage prior for a pre-defined period of time, during which the modified webpage is not publicly available on the Internet and is subject to pre-publication analyses by one or more policy engines.

8. The method of claim 7 further comprising:
performing, using at least one policy and during the embargo, computer-implemented analyses of the modified webpage to determine whether the modified webpage comprises unauthorized or prohibited content.

9. The method of claim 8 further comprising:
deleting or redacting unauthorized or prohibited content prior to publication.

10. The method of claim 8 further comprising:
preventing the modified webpage from being published if it is determined that the modified webpage comprises unauthorized or prohibited content.

11. A system comprising:
at least one data processor; and
memory storing instructions which, when executed by the at least one data processor, result in operations comprising:
receiving a user-generated request to initiate forking of an existing webpage;
determining, using a large language model (LLM), an intent of the request;
generating a query based on the determined intent;
performing an Internet search to receive content responsive to the query; and
dynamically modifying and/or enriching, by the LLM and derived from the received content responsive to the query, the existing webpage to result in a modified webpage;
wherein: (i) forking maintains both the original webpage and the modified webpage available for subsequent access as separate webpages, each webpage having a distinct uniform resource locator (URL), (ii) the existing webpage and the modified webpage are presented in a browser interface that includes a content pane displaying webpage content and an AI copilot chat pane configured to receive natural language forking requests, (iii) the dynamically modifying comprises parsing the original webpage content, creating a copy of the parsed original webpage content in a webpage data structure, and mixing the copy with LLM-generated content based on the Internet search to produce the modified webpage, and (iv) generating, by the LLM, a webpage layout for the modified webpage, the webpage layout defining content sections and content types for the modified webpage.

12. The system of claim 11, wherein the operations further comprise:
determining, by the LLM and based on the modified webpage, at least one follow up question associated with the request;
supplementing the modified webpage based on the determined at least one follow up question associated with the request.

13. The system of claim 12, wherein the modified webpage is supplemented by performing an Internet search.

14. The system of claim 12, wherein the modified webpage is supplemented by further querying the LLM for complementary information to the modified webpage.

15. The system of claim 11, wherein the operations further comprise:
receiving user-generated input changing content in the modified webpage.

16. The system of claim 15, wherein the operations further comprise:
publishing the modified webpage.

17. The system of claim 16, wherein the operations further comprise:
embargoing the modified webpage prior for a pre-defined period of time, during which the modified webpage is not publicly available on the Internet and is subject to pre-publication analyses by one or more policy engines.

18. The system of claim 17, wherein the operations further comprise:
performing, using at least one policy and during the embargo, computer-implemented analyses of the modified webpage to determine whether the modified webpage comprises unauthorized or prohibited content.

19. The system of claim 18, wherein the operations further comprise:
deleting or redacting unauthorized or prohibited content prior to publication.

20. The system of claim 18, wherein the operations further comprise:
preventing the modified webpage from being published if it is determined that the modified webpage comprises unauthorized or prohibited content.

21. The method of claim 1, wherein the webpage layout comprises a page title, a content outline specifying a hierarchical arrangement of content sections, and a writing plan specifying content sources for each content section.

22. The method of claim 1, wherein the AI copilot chat pane is configured to display LLM-generated follow-up questions related to content in the content pane.

23. The method of claim 1, wherein the LLM determines the intent of the request by classifying the request into at least one of a plurality of intent categories comprising:
modifying the webpage, enriching the webpage, deleting content from the webpage, or rewriting the webpage.

24. The method of claim 1, further comprising: determining, by the LLM, that additional information beyond the received content is required to satisfy the request; and in response, generating one or more supplemental queries to obtain additional content from the Internet.

25. The method of claim 1, wherein the query specifies at least one of: (a) data sources from which to obtain content, or (b) content data types to obtain, the content data types comprising at least one of text, images, video, or audio.

26. The method of claim 1, wherein the dynamically modifying comprises the LLM generating HTML, CSS, or JavaScript code for rendering the modified webpage.

27. The method of claim 1, further comprising: receiving, via the AI copilot chat pane, a natural language prompt specifying desired modifications to the existing webpage; and wherein the user-generated request to initiate forking is based on the natural language prompt.

28. The method of claim 1, further comprising: searching pre-existing dynamically-generated webpages to identify content matching the query; and incorporating at least a portion of the identified matching content into the modified webpage.

29. The method of claim 1, wherein the modified webpage comprises multiple content modalities generated by the LLM, the content modalities comprising at least two of: text content, video content, image content, or map content.

30. A computer-implemented method comprising:
receiving, via an AI copilot chat pane of a browser interface, a natural language prompt specifying desired modifications to an existing webpage displayed in a content pane of the browser interface;
determining, using a large language model (LLM), an intent of the natural language prompt, the intent comprising at least one of: modifying the existing webpage, enriching the existing webpage, deleting content from the existing webpage, or rewriting the existing webpage;

generating, by the LLM based on the determined intent, a contextualized query specifying at least one of data sources from which to obtain content or content data types to obtain;

performing an Internet search using the contextualized query to receive content responsive thereto;

generating, by the LLM and using webpage generation strategy instructions, a webpage layout comprising a content outline specifying a hierarchical arrangement of content sections and a writing plan specifying content sources for each content section;

parsing the existing webpage content and creating a copy of the parsed content in a webpage data structure;

dynamically generating, by the LLM, a modified webpage by mixing the copy of the parsed content with LLM-generated content derived from the received content responsive to the contextualized query and according to the webpage layout; and storing the modified webpage with a distinct uniform resource locator (URL) while maintaining the existing webpage available for subsequent access with its original URL, such that both the existing webpage and the modified webpage are independently accessible.

* * * * *